United States Patent
Even et al.

(10) Patent No.: US 6,524,656 B2
(45) Date of Patent: Feb. 25, 2003

(54) COATING METHOD

(75) Inventors: Ralph Craig Even, Blue Bell, PA (US); Robert Victor Slone, Quakertown, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 09/978,920

(22) Filed: Oct. 17, 2001

(65) Prior Publication Data

US 2002/0160118 A1 Oct. 31, 2002

Related U.S. Application Data

(60) Provisional application No. 60/270,975, filed on Feb. 23, 2001.

(51) Int. Cl.[7] .............................. B05D 3/02; B05D 7/02
(52) U.S. Cl. .................................................... 427/393.5
(58) Field of Search ...................................... 427/393.5

(56) References Cited

U.S. PATENT DOCUMENTS

| 4,777,230 A | * | 10/1988 | Kamath | 526/86 |
| 6,403,703 B1 | * | 6/1992 | Slone | 524/832 |
| 5,540,987 A | | 7/1996 | Mudge et al. | 428/288 |
| 5,753,746 A | | 5/1998 | Rupaner et al. | 524/555 |

FOREIGN PATENT DOCUMENTS

| EP | 1008635 | * | 6/2000 |
| EP | 1199316 | * | 4/2002 |
| JP | 01-138205 | * | 5/1989 |
| JP | 03-227968 | * | 10/1991 |
| JP | 09-295965 | * | 11/1997 |
| JP | 10-017606 | * | 1/1998 |
| JP | 10-130313 | * | 5/1998 |

OTHER PUBLICATIONS

Anderson et al, Journal of Coatings Technology, 68(855), pp 75–79, 1996.*

* cited by examiner

*Primary Examiner*—Erma Cameron
(74) *Attorney, Agent, or Firm*—Ronald D. Bakule

(57) ABSTRACT

A method for providing a coated substrate including: forming an aqueous coating composition including an aqueous emulsion polymer, the polymer having a glass transition temperature (Tg) from −60° C. to 80° C., formed by the free radical polymerization of at least one ethylenically unsaturated nonionic acrylic monomer, 0.1–50%, by weight based on the total weight of the polymer, ethylenically unsaturated aldehyde reactive group-containing monomer, and 0–7.5%, by weight based on the total weight of the polymer, ethylenically unsaturated acid monomer in the presence of 0.01–1.0%, by weight based on the total weight of the polymer, t-alkyl hydroperoxide, t-alkyl peroxide, or t-alkyl perester wherein the t-alkyl group includes at least 5 Carbon atoms; applying the aqueous coating composition to the substrate; and drying, or allowing to dry, the aqueous composition is provided. Also provided are a method for improving the scrub resistance of a coating, a method for lowering the minimum film formation temperature of an aqueous coating composition, and a method for improving the adhesion of a coating to a substrate.

5 Claims, No Drawings

COATING METHOD

CROSS REFERENCE TO RELATED PATENT APPLICATIONS

This is a non-provisional application of prior pending U.S. provisional application Ser. No. 60/270,975 filed Feb. 23, 2001.

This invention relates to a method for providing a coated substrate. More particularly this invention relates to a method including applying an aqueous composition including an aqueous emulsion polymer, the polymer having a glass transition temperature (Tg) from −60° C. to 80° C., the polymer formed by the free radical polymerization of at least one ethylenically unsaturated nonionic acrylic monomer, 0.1–50%, by weight based on the total weight of the polymer, ethylenically unsaturated aldehyde reactive group-containing monomer, and 0–7.5%, by weight based on the total weight of the polymer, ethylenically unsaturated acid monomer, in the presence of 0.01–1.0%, by weight based on the total weight of the polymer, t-alkyl hydroperoxide, t-alkyl peroxide, or t-alkyl perester wherein the t-alkyl group includes at least 5 Carbon atoms. And a method for improving the scrub resistance of a coating, a method for lowering the minimum film formation temperature of an aqueous coating composition, and a method for improving the adhesion of a coating to a substrate are provided.

The present invention serves to provide a method for providing a coated substrate including applying and drying an improved coating, by which is meant that the coating, "coating" herein including, for example, paint, topcoat, primer, paper coating, and leather coating, exhibits improvement in at least one of scrub resistance, marker stain blocking, exterior durability as indicated, for example, by gloss retention or cracking resistance, adhesion to substrates, water vapor permeability, and water swelling, relative to a coating in which an emulsion polymer of the same composition not so formed is employed.

U.S. Pat. No. 5,540,987 discloses emulsion polymers including at least 50% vinyl acetate having low residual formaldehyde and providing saturated cellulosic webs having improved tensile strength. The polymers are formed by the use of an hydrophobic hydroperoxide and ascorbic acid initiator throughout the course of the reaction.

The problem faced by the inventors is the provision of a method for providing a coated substrate, for improving the scrub resistance of a coating, for lowering the minimum film formation temperature of an aqueous coating composition, and for improving the adhesion of a coating to a substrate. Unexpectedly, the inventors found that the use of certain levels of t-alkyl hydroperoxide, t-alkyl peroxide, or t-alkyl perester wherein the t-alkyl group includes at least 5 Carbon atoms during the polymerization of a monomer mixture including aldehyde reactive group-containing monomers or even only in the last stages of the polymerization was sufficient to provide emulsion polymers which led to improved dry coatings properties.

In a first aspect of the present invention there is provided a method for providing a coated substrate including forming an aqueous coating composition comprising an aqueous emulsion polymer, the polymer having a glass transition temperature (Tg) from −60° C. to 80° C., formed by the free radical polymerization of at least one ethylenically unsaturated nonionic acrylic monomer, 0.1–50%, by weight based on the total weight of the polymer, ethylenically unsaturated aldehyde reactive group-containing monomer, and 0–7.5%, by weight based on the total weight of the polymer, ethylenically unsaturated acid monomer in the presence of 0.01–1.0%, by weight based on the total weight of the polymer, t-alkyl hydroperoxide, t-alkyl peroxide, or t-alkyl perester wherein the t-alkyl group includes at least 5 Carbon atoms and, optionally, at least one other oxidant; applying the aqueous coating composition to the substrate; and drying, or allowing to dry, the aqueous composition.

In a second aspect of the present invention there is provided a method for improving the scrub resistance of a coating including forming an aqueous coating composition including an aqueous emulsion polymer, the polymer having a glass transition temperature (Tg) from −60° C. to 80° C., formed by the free radical polymerization of at least one ethylenically unsaturated nonionic acrylic monomer, 0.1–50%, by weight based on the total weight of the polymer, ethylenically unsaturated aldehyde reactive group-containing monomer, and 0–7.5%, by weight based on the total weight of the polymer, ethylenically unsaturated acid monomer in the presence of 0.01–1.0%, by weight based on the total weight of the polymer, t-alkyl hydroperoxide, t-alkyl peroxide, or t-alkyl perester wherein the t-alkyl group includes at least 5 Carbon atoms and, optionally, at least one other oxidant; applying the aqueous coating composition to the substrate; and drying, or allowing to dry, the aqueous composition.

In other aspects of the present invention there are provided a method for lowering the minimum film formation temperature of an aqueous coating composition, a method for improving the adhesion of a coating to a substrate, and a method for improving the adhesion of a coating to an alkyd substrate.

This invention relates to a method including applying an aqueous coating composition including an aqueous emulsion polymer, the polymer having a glass transition temperature (Tg) from −20° C. to 80° C., formed by the free radical polymerization of at least one ethylenically unsaturated nonionic acrylic monomer, 0.1–50%, by weight based on the total weight of the polymer, ethylenically unsaturated aldehyde reactive group-containing monomer, and 0–7.5%, by weight based on the total weight of the polymer, ethylenically unsaturated acid monomer in the presence of 0.01–1.0%, by weight based on the total weight of the polymer, t-alkyl hydroperoxide, t-alkyl peroxide, or t-alkyl perester wherein the t-alkyl group includes at least 5 Carbon atoms and, optionally, at least one other oxidant.

The aqueous emulsion polymer contains at least one copolymerized ethylenically unsaturated nonionic acrylic monomer. By "nonionic monomer" herein is meant that the copolymerized monomer residue does not bear an ionic charge between pH=1–14.

The ethylenically unsaturated nonionic acrylic monomers include, for example, (meth)acrylic ester monomers including methyl acrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate, hydroxyethyl methacrylate, hydroxypropyl methacrylate. Other ethylenically unsaturated nonionic monomers which may be incorporated into the polymer include, for example, styrene and substituted styrenes; butadiene; vinyl acetate, vinyl butyrate and other vinyl esters; vinyl monomers such as vinyl chloride, vinyl toluene, and vinyl benzophenone; and vinylidene chloride. Preferred are all-acrylic, styrene/acrylic, and vinyl acetate/acrylic polymers. Preferred is a predominantly acrylic aqueous emulsion polymer. By "predominantly acrylic" herein is meant that the polymer contains greater than 50%, preferably greater than 60%, by weight, copolymerized units deriving from (meth)acrylic monomers such as, for example, (meth)acrylate esters, (meth)acrylamides, (meth) acrylonitrile, and (meth)acrylic acid. The use of the term "(meth)" followed by another term such as acrylate or acrylamide, as used throughout the disclosure, refers to both acrylates or acrylamides and methacrylates and methacrylamides, respectively.

The emulsion polymer contains from 0.1% to 50%, by weight based on total monomer weight, of a copolymerized ethylenically-unsaturated aldehyde reactive group-containing monomer, based on the weight of the polymer. By "aldehyde reactive group-containing monomer" is meant herein a monomer which, in a homogeneous solution containing 20% by weight of the monomer and an equimolar amount of formaldehyde at any pH from 1 to 14, will exhibit greater than 10% extent of reaction between the monomer and formaldehyde on a molar basis in one day at 25° C. Included as ethylenically-unsaturated aldehyde reactive group-containing monomers are, for example, vinyl acetoacetate, acetoacetoxyethyl (meth)acrylate, acetoacetoxypropyl (meth)acrylate, allyl acetoacetate, acetoacetoxybutyl (meth)acrylate, 2,3-di(acetoacetoxy)propyl (meth)acrylate, vinyl acetoacetamide, acetoacetoxyethyl (meth)acrylamide, 3-(2-vinyloxyethylamino)-propionamide, N-(2-(meth)acryloxyethyl)-morpholinone-2, 2-methyl-1-vinyl-2-imidazoline, 2-phenyl-1-vinyl-2-imidazoline, 2-(3-Oxazolidinyl)ethyl (meth)acrylate, N-(2-vinoxyethyl)-2-methyloxazolidine, 4,4-dimethyl-2-isopropenyloxazoline, 3-(4-pyridyl)propyl (meth)acrylate, 2-methyl-5-vinyl-pyridine, 2-vinoxyethylamine, 2-vinoxyethylethylene-diamine, 3-aminopropyl vinyl ether, 2-amino-2-methylpropyl vinyl ether, 2-aminobutyl vinyl ether, tert-butylaminoethyl (meth)acrylate, 2-(meth) acryloxyethyldimethyl-β-propiobetaine, diethanolamine monovinyl ether, o-aniline vinyl thioether, (meth) acryloxyacetamido-ethylethyleneurea, ethyleneureidoethyl (meth)acrylate, (meth)acrylamidoethyl-ethyleneurea, (meth) acrylamidoethyl-ethylenethiourea, N-((meth) acrylamidoethyl)-N$^1$-hydroxymethylethyleneurea, N-((meth)acrylamidoethyl)-N$^1$-methoxymethylethyleneurea, N-formamidoethyl-N$^1$-vinylethyleneurea, N-vinyl-N$^1$-aminoethyl-ethyleneurea, N-(ethyleneureidoethyl)-4-pentenamide, N-(ethylenethioureido-ethyl)-10-undecenamide, butyl ethyleneureido-ethyl fumarate, methyl ethyleneureido-ethil fumarate, benzyl N-(ethyleneureido-ethyl) fumarate, benzyl N-(ethyleneureido-ethyl) maleamate, N-vinoxyethylethylene-urea, N-(ethyleneureidoethyl)-crotonamide, ureidopentyl vinyl ether, 2-ureidoethyl (meth) acrylate, N-2-(allylcarbamoto)aminoethyl imidazolidinone, 1-(2-((20hydroxy-3-(2-propenyloxy)propyl)amino)ethyl)-2-imidazolidinone, hydrogen ethyleneureidoethyl itaconamide, ethyleneureidoethyl hydrogen itaconate, bis-ethyleneureidoethyl itaconate, ethyleneureidoethyl undecylenate, ethylene ureidoethyl undecylenamide, 2-(3-methylolimidazolidone-2-yl-1)ethyl acrylate, N-acryloxyalkyl oxazolidines, acylamidoalkyl vinyl alkyleneureas, aldehyde-reactive amino group-containing monomers as dimethyaminoethyl methacrylate, and ethylenically unsaturated monomers containing azirdene functionality. Preferred is 0.5% to 20%, more preferred is 1% to 10%, by weight based on total monomer weight, of a copolymerized ethylenically-unsaturated aldehyde reactive group-containing monomer, based on the weight of the polymer.

In an alternative embodiment polymers containing a sufficient amount of copolymerized monomer(s) having reactive functionality, which is not reactive with aldehydes, to provide, after reaction during or after the emulsion polymerization, 0.1–50%, by weight based on the total weight of the emulsion polymer, copolymerized aldehyde-reactive monomer equivalent are also contemplated. By "copolymerized monomer equivalent" is meant herein the copolymerized monomer which would have led to the copolymer even though the polymer was formed by a post-polymerization reaction rather than directly formed by the copolymerization of that monomer. In this embodiment, for example, the reaction product of polymers containing carboxylic acid functionality with compounds consisting of or containing an aziridine (ethyleneimine) ring or rings may be formed. Substitution on the ring may be on the nitrogen and/or either or both carbons such as, for example, ethyleneimine, propyleneimine, N-(2-hydroxyethyl) ethyleneimine, trimethylolpropane-tris-(β-(N-aziridinyl) propionate), and pentaerythritol trimethylolpropane-tris-(β-(N-aziridinyl) propionate). Also, polymers containing β-aminoester and/or β-hydroxyamide functionality may be formed by post-polymerization processes.

The emulsion polymer contains from 0% to 7.5%, by weight based on total monomer weight, of a copolymerized monoethylenically-unsaturated acid monomer, based on the weight of the polymer, such as, for example, acrylic acid, methacrylic acid, crotonic acid, itaconic acid, fumaric acid, maleic acid, monomethyl itaconate, monomethyl fumarate, monobutyl fumarate, maleic anhydride, 2-acrylamido-2-methylpropane sulfonic acid, vinyl sulfonic acid, styrene sulfonic acid, 1-allyloxy-2-hydroxypropane sulfonic acid, alkyl allyl sulfosuccinic acid, sulfoethyl (meth)acrylate, phosphoalkyl (meth)acrylates such as phosphoethyl (meth) acrylate, phosphopropyl (meth)acrylate, and phosphobutyl (meth)acrylate, phosphoalkyl crotonates, phosphoalkyl maleates, phosphoalkyl fumarates, phosphodialkyl (meth) acrylates, phosphodialkyl crotonates, and allyl phosphate.

The emulsion polymer used in this invention may contain from 0% to 1%, by weight based on monomer weight, copolymerized multi-ethylenically unsaturated monomers such as, for example, allyl methacrylate, diallyl phthalate, 1,4-butylene glycol dimethacrylate, 1,2-ethylene glycol dimethacrylate, 1,6-hexanediol diacrylate, and divinyl benzene.

The glass transition temperature ("Tg") of the emulsion polymer is measured by differential scanning calorimetry (DSC) taking the mid-point in the heat flow versus temperature transition as the Tg value, the monomers and amounts of the monomers being selected to achieve the desired polymer Tg range as is well known in the art. The preferred Tg of the emulsion polymer described hereinabove for use in coatings is from −60° C. to 80° C., more preferably from −10° C. to 60° C., most preferably from 0° C. to 40° C.

The polymerization techniques used to prepare aqueous emulsion-polymers are well known in the art. In the emulsion polymerization process conventional surfactants may be used such as, for example, anionic and/or nonionic emulsifiers such as, for example, alkali metal or ammonium salts of alkyl, aryl, or alkylaryl sulfates, sulfonates or phosphates; alkyl sulfonic acids; sulfosuccinate salts; fatty acids; ethylenically unsaturated surfactant monomers; and ethoxylated alcohols or phenols. The amount of surfactant used is usually 0.1% to 6% by weight, based on the weight of monomer. Either thermal or redox initiation processes may be used. The reaction temperature is maintained at a temperature lower than 120° C. throughout the course of the reaction. Preferred is a reaction temperature between 30° C.

and 95° C., more preferably between 50° C. and 90° C. The monomer mixture may be added neat or as an emulsion in water. The monomer mixture may be added in one or more additions or continuously, linearly or not, over the reaction period, or combinations thereof.

Conventional free radical initiators (oxidants) which may be used in addition to 0.01–1.0%, by weight based on the total weight of the polymer, t-alkyl hydroperoxide, t-alkyl peroxide, or t-alkyl perester wherein the t-alkyl group includes at least 5 Carbon atoms, preferably 0.01–1.0%, by weight based on the total weight of the polymer, t-alkyl hydroperoxide wherein the t-alkyl group includes at least 5 Carbon atoms; and more preferably 0.01–1.0%, by weight based on the total weight of the polymer, of t-amyl hydroperoxide include, for example, hydrogen peroxide, sodium peroxide, potassium peroxide, t-butyl hydroperoxide, cumene hydroperoxide, ammonium and/or alkali metal persulfates, sodium perborate, perphosphoric acid and salts thereof, potassium permanganate, and ammonium or alkali metal salts of peroxydisulfuric acid, typically at a level of 0.01% to 3.0% by weight, based on the weight of total monomer. Redox systems using one or more of the same initiators and a suitable reductant such as, for example, sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, hydroxymethanesulfonic acid, sodium 2-hydroxy-2-sulfinatoacetic acid, acetone bisulfite, amines such as ethanolamine, glycolic acid, glyoxylic acid hydrate, lactic acid, glyceric acid, malic acid, tartaric acid and salts of the preceding acids may be used. Redox reaction catalyzing metal salts of iron, copper, manganese, silver, platinum, vanadium, nickel, chromium, palladium, or cobalt may be used.

By "in the presence of 0.01–1.0%, by weight based on the total weight of the polymer, t-alkyl hydroperoxide, t-alkyl peroxide, or t-alkyl perester wherein the t-alkyl group includes at least 5 Carbon atoms" is meant that the cumulative amount of t-alkyl hydroperoxide, t-alkyl peroxide, or t-alkyl perester wherein the t-alkyl group includes at least 5 Carbon atoms which has been added to the reaction zone wherein at least some of the monomers are being converted to the emulsion polymer is 0.01–1.0%, by weight based on the total weight of the polymer; optionally wherein at least 95%, preferably the last 95%, by weight of the monomers are being converted to the emulsion polymer; optionally wherein at least 75%, preferably the last 75, by weight of the monomers are being converted to the emulsion polymer; optionally wherein at least the last 50% by weight of the monomers are being converted to the emulsion polymer; and optionally wherein at least the last 20% by weight of the monomers are being converted to the emulsion polymer. The optional additional oxidant includes those listed hereinabove as conventional free radical initiators such as, for example, tert-butylhydroperoxide, hydrogen peroxide, ammonium persulfate, and the like. In certain embodiments of the present invention, it is advantageous to choose a mixture containing one hydrophilic initiator and the relatively hydrophobic t-alkyl hydroperoxide, t-alkyl peroxide, or t-alkyl perester wherein the t-alkyl group includes at least 5 Carbon atoms in order to increase the overall efficiency of the initiator system with regard to the initiation of the full range of hydrophilic and hydrophobic monomers; preferably the optional additional oxidant(s) are less than 50% by weight of the total amount of initiator/oxidant. In this embodiment the t-alkyl hydroperoxide, t-alkyl peroxide, or t-alkyl perester wherein the t-alkyl group includes at least 5 Carbon atoms initator(s) and optional at least one other oxidant may be used as such or as the oxidant component(s) of a redox system using the same initiator(s) coupled with at least one suitable reductant such as those listed hereinabove.

In one embodiment, after 90–99.7%, preferably 95–99.7%, of the monomers by weight, based on the total weight of the polymer, have been converted to polymer, at least half of the remaining monomer is converted to polymer in the presence of 0.01–1.0%, by weight based on the total weight of the polymer, of t-alkyl hydroperoxide, t-alkyl peroxide, or t-alkyl perester wherein the t-alkyl group includes at least 5 Carbon atoms; preferably in the presence of 0.01–1.0%, by weight based on the total weight of the polymer, of t-alkyl hydroperoxide wherein the t-alkyl group includes at least 5 Carbon atoms; and more preferably in the presence of 0.01–1.0%, by weight based on the total weight of the polymer, of t-amyl hydroperoxide. This part of the reaction may be effected as soon as 90–99.7%, preferably 95–99.7%, conversion of the monomers to polymer is completed in the same reaction vessel or kettle. It may be effected after a period of time, in a different reaction vessel or kettle, or at a different temperature than the preceding part of the polymerization. Preferred is the presence of t-alkyl hydroperoxide, t-alkyl peroxide, or t-alkyl perester wherein the t-alkyl group includes at least 5 Carbon atoms only after 90%, more preferably only after 95%, conversion of the monomers to polymer is completed.

The t-alkyl hydroperoxide, t-alkyl peroxide, or t-alkyl perester wherein the t-alkyl group includes at least 5 Carbon atoms, optional additional oxidant(s), and optional reductant(s) may be added, for example, together or separately, in one or more shots or gradually, whether uniformly or not, or in combinations thereof or variations thereon as is desired; they may be added neat, in solution, or emulsified in an appropriate medium.

Chain transfer agents such as, for example, halogen compounds such as tetrabromomethane; allyl compounds; or mercaptans such as alkyl thioglycolates, alkyl mercaptoalkanoates, and $C_4$–$C_{22}$ linear or branched alkyl mercaptans may be used to lower the molecular weight of the formed polymer and/or to provide a different molecular weight distribution than would otherwise have been obtained with any free-radical-generating initiator(s). Linear or branched $C_4$–$C_{22}$ alkyl mercaptans such as n-dodecyl mercaptan and t-dodecyl mercaptan are preferred. Chain transfer agent(s) may be added in one or more additions or continuously, linearly or not, over most or all of the entire reaction period or during limited portion(s) of the reaction period such as, for example, in the kettle charge and in the reduction of residual monomer stage.

The emulsion polymer is also contemplated to be formed in two or more stages, the stages differing, for example, in composition and/or molecular weight.

The average particle diameter of the emulsion-polymerized polymer particles is preferred to be from 30 nanometers to 500 nanometers, as measured by a BI-90 Particle Sizer. Also contemplated are multimodal emulsion polymers in which at least two different particle sizes are included.

The aqueous composition is prepared by techniques which are well known in the coatings art. First, if the coating composition is to be pigmented, at least one pigment is well dispersed in an aqueous medium under high shear such as is afforded by a COWLES® mixer. Then the aqueous emulsion polymer is added under lower shear stirring along with other coating adjuvants as desired. Alternatively, the aqueous emulsion polymer may be included in the pigment dispersion step. The aqueous composition may contain conventional coating adjuvants such as, for example, tackifiers, pigments, emulsifiers, crosslinkers, coalescing agents, buffers, neutralizers, thickeners or rheology modifiers, humectants, wetting agents, biocides, plasticizers, antifoaming agents, colorants, waxes, and anti-oxidants.

The solids content of the aqueous coating composition may be from about 10% to about 85% by volume. The viscosity of the aqueous composition may be from 0.05 to 2000 Pa.s (50 cps to 2,000,000 cps), as measured using a Brookfield viscometer; the viscosities appropriate for different end uses and application methods vary considerably.

The aqueous composition may applied by conventional application methods such as, for example, brush or paint roller, air-atomized spray, air-assisted spray, airless spray, high volume low pressure spray, air-assisted airless spray, and electrostatic spray.

The aqueous composition may be applied to a substrate such as, for example, plastic including sheets and films, wood, metal, previously painted surfaces, weathered or aged substrates, cementitious substrates, and asphaltic substrates, with or without a prior substrate treatment such as a primer.

The aqueous composition coated on the substrate is typically dried, or allowed to dry, at a temperature from 20° C. to 95° C.

In one embodiment a method for improving the adhesion of a coating comprising a colloidally-stabilized emulsion polymer to an alkyd substrate, particularly to an aged or weathered alkyd substrate, is provided. By "colloidally-stabilized" emulsion polymer herein is meant an emulsion polymer prepared, at least in part, in the presence of a nonionic colloidal stabilizer. Without being bound by theory, it is believed that such a process results in the grafting of at least part of the colloidal stabilizer on the emulsion polymer with beneficial effect on the rheology of coatings prepared therefrom. The method of this invention includes forming an aqueous coating composition including (1) a first aqueous emulsion polymer including 0–2%, by weight based on the total weight of the first polymer, ethylenically unsaturated aldehyde reactive group-containing monomer, the first polymer having a glass transition temperature from –60° C. to 80° C. and a particle diameter of 200 to 1000 nanometers, prepared, at least in part, in the presence of 0.001–6%, by weight based on the dry weight of said first emulsion polymer, of a colloidal stabilizer selected from the group consisting of hydroxyethyl cellulose, N-vinyl pyrrolidone, polyvinyl alcohol, partially acetylated polyvinyl alcohol, carboxymethyl cellulose, gum arabic, and mixtures thereof, said colloidal stabilizer and (2) a second aqueous emulsion polymer, the second polymer having a glass transition temperature (Tg) from –60° C. to 80° C. and a particle diameter of 30 to 200 nanometers, formed by the free radical polymerization of at least one ethylenically unsaturated nonionic acrylic monomer, 0.1–12.5%, preferably 0.25–7.5%, by weight based on the total weight of the second polymer, ethylenically unsaturated aldehyde reactive group-containing monomer, and 0–7.5%, by weight based on the total weight of the polymer, ethylenically unsaturated acid monomer in the presence of 0.01–1.0%, by weight based on the total weight of the polymer, t-alkyl hydroperoxide, t-alkyl peroxide, or t-alkyl perester wherein the t-alkyl group includes at least 5 Carbon atoms and, optionally, at least one other oxidant, wherein the dry weight ratio of the second polymer to the first polymer is from 1:99 to 1:1; applying the aqueous coating composition to the alkyd substrate; and drying, or allowing to dry, the aqueous composition. The method provides adhesion improved relative to that engendered when a colloidally-stabilized emulsion polymer is used without the second emulsion polymer (the aqueous emulsion polymer used in this invention) in a corresponding aqueous coating composition.

The following examples are presented to illustrate the invention and the results obtained by the test procedures.

Abbreviations

MAA=methacrylic acid
BA=butyl acrylate
MMA=methyl methacrylate
AAEM=(2-acetoacetoxy)ethyl methacrylate
APS=ammonium persulfate
IAA=D-isoascorbic acid
t-BHP=t-butyl hydroperoxide
t-AHP=t-amyl hydroperoxide
DI water=deionized water

COMPARATIVE EXAMPLE A

Preparation of Aqueous Emulsion Polymer 960 g BA, 970 g MMA, 40 g MAA and 2.5 g n-dodecanethiol were combined with 800 g DI water, 13.8 g sodium carbonate and 61 g 28% sodium lauryl sulfate and emulsified with stirring. 10.4 g 28% sodium lauryl sulfate and 760 g DI water were charged to a 5 liter multi-neck flask fitted with mechanical stirring. The flask contents were heated to 65° C. under nitrogen. To the stirred kettle contents were added 70 g monomer emulsion followed by 0.04 g ferrous sulfate heptahydrate and 0.04 g tetrasodium salt of ethylenediamine-tetraacetic acid in 31.4 g DI water. Polymerization was initiated by the addition of 1.1 g APS in 16 g DI water followed by 0.54 g sodium hydrosulfite in 16 g DI water. 60 grams of a 50% solution of a ureido-functional methacrylate was added to the remainder of the monomer emulsion and gradual addition of the monomer emulsion was subsequently initiated. Separate solutions of 5.8 g APS in 100 g DI water and 2 g of IAA in 100 g DI water were fed concurrently with the monomer emulsion. Total addition time for the three feeds was 90–100 minutes. Reactor temperature was maintained at 65° C. throughout the polymerization. 40 g DI water was used to rinse the emulsion feed line to the reactor. After completion of the monomer emulsion addition the reactor was cooled to 60° C. Unreacted monomers were reduced through the addition of 10 ppm ferrous sulfate, 2 g 70% t-BHP and 1 g IAA as separate aqueous solutions. The polymer emulsion was neutralized to pH 9.1 with ammonium hydroxide.

EXAMPLE 1

Preparation of Aqueous Emulsion Polymer

The emulsion polymer of Example 1 was prepared by a process identical to that used to make Comparative Example A with the exception that the 2 g 70% t-BHP used in the reduction of ureacted monomers was replaced with 2 g 83% t-AHP added to the reactor neat.

EXAMPLE 2

Preparation of Aqueous Emulsion Polymer 960 g BA, 970 g MMA, 40 g MAA and 2.5 g n-dodecanethiol were combined with 800 g DI water, 13.8 g sodium carbonate and 61 g 28% sodium lauryl sulfate and emulsified with stirring. 10.4 g 28% sodium lauryl sulfate and 860 g DI water were charged to a 5 liter multi-neck flask fitted with mechanical stirring. The flask contents were heated to 65° C. under nitrogen. To the stirred kettle contents were added 70 g monomer emulsion followed by 0.04 g ferrous sulfate heptahydrate and 0.04 g tetrasodium salt of ethylenediamine-tetraacetic acid in 31.4 g DI water. Polymerization was initiated by the addition of 1.1 g APS in 16 g DI water followed by 0.54 g sodium hydrosulfite in 16 g DI water. 60 g of a 50% solution of ureido-functional methacrylate monomer was added to the remainder of the monomer emulsion. 6.5 g 70% t-BHP was added to the reactor and gradual addition of the monomer emulsion was subsequently initiated. A separate solution of 2 grams of IAA in 100 g DI water was fed concurrently with the monomer emulsion. Total addition time for the three feeds was 90–100 minutes. Reactor temperature was maintained at 65° C. throughout the polymerization. 40 g DI water was used to rinse the emulsion feed line to the reactor. After completion of the monomer emulsion addition the reactor was cooled to 60° C. 10 ppm ferrous sulfate, 2 g 70% t-AHP and 1 g IAA in aqueous solution were added. The polymer emulsion was neutralized to pH 9.0 with ammonium hydroxide.

EXAMPLE 3

Preparation of Aqueous Emulsion Polymer 960 g BA, 970 g MMA, 40 g MAA and 2.5 g n-dodecanethiol were combined with 800 g DI water, 13.8 g sodium carbonate and 61 g 28% sodium lauryl sulfate and emulsified with stirring. 10.4 g 28% sodium lauryl sulfate and 860 g DI water were charged to a 5 liter multi-neck flask fitted with mechanical stirring. The flask contents were heated to 65° C. under nitrogen. To the stirred kettle contents were added 70 g monomer emulsion followed by 0.04 g ferrous sulfate heptahydrate and 0.04 g tetrasodium salt of ethylenediamine-tetraacetic acid in 31.4 g DI water. Polymerization was initiated by the addition of 1.1 g APS in 16 g DI water followed by 0.54 g sodium hydrosulfite in 16 g DI water. 60 g of 50% solution of ureido-functional methacrylate was added to the remainder of the monomer emulsion. 6.5 g 70% t-AHP was added to the reactor and gradual addition of the monomer emulsion was subsequently initiated. A separate solution of 2 g IAA in 100 g DI water was fed concurrently with the monomer emulsion. Total addition time for the three feeds was 90–100 minutes. Reactor temperature was maintained at approximately 65° C. throughout the polymerization. 40 g DI water was used to rinse the emulsion feed line to the reactor. After completion of the monomer emulsion addition the reactor was cooled to 60° C. Unreacted monomers were reduced through the addition of 10 ppm ferrous sulfate, 2 g 70% t-AHP and 1 g IAA in aqueous solution. The polymer emulsion was neutralized to pH 9.0 with ammonium hydroxide. Brookfield LVTD Viscometer @ 60 rpm

COMPARATIVE EXAMPLE B

Preparation of Aqueous Emulsion Polymer 480 g BA, 485 g MMA and 20 g MAA were combined with 455 g DI water, 6.9 g sodium carbonate and 30.5 g 28% sodium lauryl sulfate and emulsified with stirring. 5.2 g 28% sodium lauryl sulfate and 400 g DI water were charged to a 3 liter multi-neck flask fitted with mechanical stirring. The flask contents were heated to 85° C. under nitrogen. To the stirred kettle contents were added 35 g monomer emulsion followed by 3.5 g APS in 10 g DI water. 30 g of a 50% solution of ureido-functional methacrylate was added to the remainder of the monomer emulsion and gradual addition of the monomer emulsion was subsequently initiated. Total addition time for the monomer emulsion was 90–100 minutes. Reactor temperature was maintained at 83° C. throughout the polymerization. 20 g DI water was used to rinse the emulsion feed line to the reactor. After completion of the monomer emulsion addition the reactor was cooled to 60° C. Unreacted monomers were reduced through the addition of 10 ppm ferrous sulfate, 1 g t-BHP and 0.5 g IAA in aqueous solutions. The polymer emulsion was neutralized to pH 9.1 with ammonium hydroxide.

EXAMPLE 4

Preparation of Aqueous Emulsion Polymer

The process for Example 4 was identical to that used to make Comparative Example B with the exception that the 1 g of 70% t-BHP used in the monomer reduction stage was replaced with 1 g 83% t-AHP added to the reactor neat.

TABLE 4.1

Physical properties of Examples 1–4 and Comparative Examples A–B
PHYSICAL PROPERTIES OF AQUEOUS EMULSION POLYMERS:

| EXAMPLE | SOLIDS (%) | PARTICLE SIZE (nm) | pH | VISCOSITY (cps) |
|---|---|---|---|---|
| Comp. A | 49.9 | 116 | 9.1 | 100 |
| 1 | 49.7 | 121 | 9.1 | 110 |
| 2 | 49.8 | 125 | 9.0 | 125 |
| 3 | 49.8 | 119 | 9.0 | 140 |
| Comp. B | 50.3 | 138 | 9.1 | 1280 |
| 4 | 50.0 | 140 | 9.0 | 840 |

Note: Particle Sizes determined by Brookhaven Instruments BI-90 Particle Sizer Total Solids determined by weight loss after 30–45 minutes at 150° C. Viscosity determined using Brookfield LVTD Viscometer @ 60 rpm

EXAMPLE 5

Preparation and Evaluation of Aqueous Coating Compositions

Semi-gloss coating compositions were prepared as follows:

| Material | Grams |
|---|---|
| Propylene Glycol | 18.2 |
| TAMOL ™ 731 | 6.45 |
| FOAMASTER ™ VL | 0.5 |
| TI-PURE ™ R-900 | 126.50 |
| Water | 31.0 |

The ingredients listed above were mixed under high shear in a Cowles mixer.

Then the ingredients listed below were added in order under low shear mixing.

| Emulsion Polymer | 232.29 |
|---|---|
| ROPAQUE ™ ULTRA | 14.40 |
| TEXANOL ™ | 4.83 |
| FOAMASTER ™ VL | 0.5 |
| ACRYSOL ™ RM-1020 | 14.2 |
| ACRYSOL ™ RM-825 | 0.25 |
| Water | 77.79 |

Scrub Resistance measurement: Two aqueous coating compositions having the same volume solids were drawn down on a single black vinyl chart. The compositions were drawn in such a way that the two compositions were placed side by side and drawn together by a single drawing with a 0.0762 mm (3-mil) Bird film applicator (152.4 mm (6 inch) in width). Such a drawing assured that each composition formed a 7.5 cm (3 inch) wide coating on a single chart, and the two compositions had the same coating thickness. The sample was allowed to dry at 23° C. (73° F.) and 50% relative humidity for 7 days. Abrasive scrub resistance was measured with a scrub machine (Gardner Abrasive Tester) using 10 g scrub medium and 5 g water. A piece of 0.0254 mm (1-mil) thick and 76.2 mm (3 inch) wide vinyl shim was placed underneath the sample vinyl chart. The two side edges of the shim were in the center of each coating. The number of cycles at the first spot of each coating removed was recorded. The scrub resistance was reported as a percentage of number of cycles of the coating versus the other coating.

Coating compositions were prepared as above using the emulsion polymers of Examples 1–4 and Comparative Examples A–B as the "Emulsion Polymer". A dry film of each composition was prepared and the Scrub Resistance of the film was measured according to the test method presented above. Results are presented in Tables 5.1–5.3

TABLE 5.1

Scrub resistance results

| Emulsion Polymer | Comp. Ex. A | Ex. 1 |
|---|---|---|
| Polymerization Initiators | APS/IAA | APS/IAA |
| Monomer Reduction Initiators | t-BHP/IAA | t-AHP/IAA |
| Scrub Resistance (as % of Comp. Ex. A coating) | 100 | 121 |

The coated substrate of this invention containing the emulsion polymer of Example 1 exhibits superior scrub resistance relative to the coated substrate containing the emulsion polymer of Comparative Example A. Example 1 is expected to have adhesion to the substrate superior to that of Comparative Example A.

TABLE 5.2

Scrub resistance results

| Emulsion Polymer | Ex. 2 | Ex. 3 |
|---|---|---|
| Polymerization Initiators | t-BHP/IAA | t-AHP/IAA |
| Monomer Reduction Initiators | t-AHP/IAA | t-AHP/IAA |
| Scrub Resistance (as % of Ex. 2 coating) | 100 | 126 |

The coated substrates of this invention containing the emulsion polymer of Examples 2–3 provide a useful level of scrub resistance. The coating of Example 3 incorporating t-amyl hydroperoxide throughout provides superior scrub resistance to that incorporating t-amyl peroxide only in the monomer reduction stage.

TABLE 5.3

Scrub resistance results

| Emulsion polymer | Comp. Ex. B | Ex. 4 |
|---|---|---|
| Monomer Reduction Initiators | t-BHP/IAA | t-AHP/IAA |
| Scrub Resistance (as % of Comp. Ex. B coating) | 100 | 111 |

The coated substrate of this invention containing the emulsion polymer of Example 4 exhibits superior scrub resistance relative to the coated substrate containing the emulsion polymer of Comparative Example B. Example 4 is expected to have adhesion to the substrate superior to that of Comparative Example B.

COMPARATIVE EXAMPLE C

Preparation of Aqueous Emulsion Polymer 960 g BA, 900 g MMA, 100 g AAEM and 40 g MAA are combined with 800 g DI water, 13.8 g sodium carbonate and 61 g 28% sodium lauryl sulfate and emulsified with stirring. 10.4 g 28% sodium lauryl sulfate and 760 g DI water are charged to a 5 iter multi-neck flask fitted with mechanical stirring. The flask contents are heated to 65° C. under nitrogen. To the stirred kettle contents are added 70 g monomer emulsion followed by 0.04 g ferrous sulfate heptahydrate and 0.04 g tetrasodium salt of ethylenediaminetetraacetic acid in 31.4 g DI water. Polymerization is initiated by the addition of 1.1 g APS in 16 g DI water followed by 0.54 g sodium hydrosulfite in 16 g DI water. Gradual addition of the monomer emulsion is subsequently initiated. Separate solutions of 5.8 g ammonium persulfate in 100 g DI water and 2 g IAA in 100 g DI water are fed concurrently with the monomer emulsion. Total addition time for the three feeds is 90–100 minutes. Reactor temperature is maintained at 65° C. throughout the polymerization. 40 g DI water is used to rinse the emulsion feed line to the reactor. After completion of the monomer emulsion addition the reactor is cooled to 60° C. Unreacted monomers are reduced through the addition of 10 ppm ferrous sulfate, 2 g 70% t-BHP and 1 g IAA in separate aqueous solutions. The polymer emulsion is neutralized to pH 9 with ammonium hydroxide.

EXAMPLE 6

Preparation of Aqueous Emulsion Polymer

The process for Example 6 is identical to that used to make Comparative Example C with the exception that the 2 g of 70% t-BHP used in the monomer reduction stage are replaced with 2 g 83% t-AHP added to the reactor neat.

EXAMPLE 7

Evaluation of MFFT for Aqueous Coating Compositions

Minimum Film Formation Temperature ("MFFT") measurement: Minimum film formation temperature is measured with a MFFT Bar (Rhopoint, Ltd.). A strip of 20 mm wide SCOTCHT™ tape is laid onto the surface of MFFT Bar. A latex sample is drawn down on the SCOTCHT™ tape to form a film with a 0.10 mm (4 mil) film applicator. The film is allowed to dry for 2 hours. The Scotch tape is then peeled from the surface of MFFT Bar in such a way that the portion of the film peeled is always perpendicular to the portion of the film remaining on the surface of MFFT Bar until the first cracking is observed on the peeled film. The temperature that corresponds to the first cracking is recorded as the minimum film formation temperature of the latex sample.

0.5 g TEXANOL™ is added with mixing to 50 g emulsion polymer from Example 6 and Comparative Example C to form Example 8 and Comparative Example D, respectively. Stirring continues for 15 minutes after addition and the mixture is allowed to equilibrate for a minimum of 24 hours. Examples 6, 8, and Comparative Examples C–D are subjected to the minimum film forming temperature test method described above. It is expected that the minimum film formation temperature of Example 6 is lower than that of Comparative Example C. It is expected that the minimum film formation temperature of Example 8 is lower than that of Comparative Example D. A lower MFFT is desired for more facile and/or more complete film formation and improved adhesion.

Dried coatings containing the emulsion polymers of Examples 6 or 8 of this invention are expected to exhibit less yellowing tendency than dried coatings containing the emulsion polymers of Comparative Examples C or D, respectively.

Note: TAMOL™, ROPAQUE™ and ACRYSOLυ are trademarks of Rohm and Haas Company. FOAMASTER™ is a trademark of Henkel Corp. TI-PURE™ is a trademark of EL DuPont de Nemours. Co. TEXANOL™ is a trade mark of Eastman Chemical Co.

EXAMPLE 9

AND COMPARATIVE EXAMPLE D

Preparation of Aqueous Emulsion Polymers and Evaluation of MFFT

Preparation of Comparative Example D. 380 g BA, 485 g MMA, 100 g AAEM and 20 g Maa were combined with 450 g DI water, 6.9 g sodium carbonate and 30.5 g 28% sodium lauryl sulfate and emulsified with stirring. 5.2 g 28% sodium lauryl sulfate and 400 g DI water were charged to a 3 liter multi-neck flask fitted with mechanical stirring. The flask contents were heated to 86–89° C. under nitrogen. To the stirred kettle contents were added 35 g monomer emulsion followed by 3.5 g ammonium persulfate in 10 g DI water. 30 grams of a 50% solution of ureido-functional monomer was added to the remainder of the monomer emulsion and gradual addition of the monomer emulsion was subsequently begun. Reactor temperature was maintained at 87° C. throughout the polymerization. 20 g DI water was used to rinse the emulsion feed line to the reactor upon completion of the monomer emulsion feed. After completion of the monomer emulsion addition the reactor was cooled to 70° C. 10 ppm ferrous sulfate, 1 g t-BHP and 0.5 g D-Isoascorbic acid in aqueous solutions were added. The polymer emulsion was neutralized to pH 9–10 with ammonium hydroxide.

Preparation of Example 9. The process was identical to that used to make Comparative Example E with the exception that the 1 g of 70% t-BHP was replaced with 0.95 g 83% t-AHP added to the reactor neat.

PHYSICAL PROPERTIES OF AQUEOUS EMULSION POLYMERS:

| EXAMPLE | SOLIDS (wt %) | PARTICLE SIZE (nm) | pH | VISCOSITY (cps) | MFFT (° C.) |
| --- | --- | --- | --- | --- | --- |
| Comp. E | 48.5 | 142 | 10.0 | 294 | 29.6 |
| 9 | 48.5 | 132 | 10.1 | 371 | 27.3 |

The aqueous emulsion polymer of Example 9 of this invention exhibits a lower MFFT compared to Comparative Example E. It is expected that this difference would manifest in better film formation for aqueous coating compositions including the emulsion polymer of Example 9 of this invention compared to corresponding compositions including the emulsion polymer of Comparative Example E.

COMPARATIVE EXAMPLES AA–AG

Preparation of Emulsion Polymers

Comparative Example AA is made according to the procedure of Comparative Example A with the exceptions that the 60 g charge of 50% ureido-functional methacrylate is increased to 200 g and the 970 g charge of MMA is decreased to 900 g.

Comparative Examples AB–AG are made according to the procedure of Comparative Example AA with the exception that the 61 g SLS used in the make-up of the monomer emulsion and the 10.4 g SLS added to the reaction vessel are replaced with the surfactant charges listed in Table A.

EXAMPLES 1A–1G

Preparation of Emulsion Polymers

Example 1A is made according to the procedure of Example 1 with the exceptions that the 60 g charge of 50% ureido-functional methacrylate is increased to 200 g and the 970 g charge of MMA is decreased to 900 g.

Examples 1B–1G are made according to the procedure of Example 1A with the exception that the 61 g SLS used in the make-up of the monomer emulsion and the 10.4 g SLS added to the reaction vessel are replaced with the surfactant charges listed in Table A.

EXAMPLES 2A–2G

Preparation of Emulsion Polymers

Example 2A is made according to the procedure of Example 2 with the exceptions that the 60 g charge of 50% ureido-functional methacrylate is increased to 200 g and the 970 g charge of MMA is decreased to 900 g.

Examples 2B–2G are made according to the procedure of Example 2A with the exception that the 61 g SLS used in the make-up of the monomer emulsion and the 10.4 g SLS added to the reaction vessel are replaced with the surfactant charges listed in Table A.

EXAMPLES 3A TO 3G

Preparation of Emulsion Polymers

Example 3A is made according to the procedure of Example 3 with the exceptions that the 60 g charge of 50% ureido-functional methacrylate is increased to 200 g and the 970 g charge of MMA is decreased to 900 g.

Examples 3B–3G are made according to the procedure of Example 3A with the exception that the 61 g SLS used in the make-up of the monomer emulsion and the 10.4 g SLS added to the reaction vessel are replaced with the surfactant charges listed in Table A.

TABLE A

Surfactant Charges for Comparative Examples AB–AG and Examples 1B–1G, 2B–2G and 3B–3G

| COMP. EXAMPLE | EXAMPLE | SURFACTANT | KETTLE CHARGE | MOMOMER EMULSION CHARGE |
|---|---|---|---|---|
| AA | 1A, 1B, 1C | Sodium Lauryl Sulfate, 28% active (SLS) | 10.4 g | 61 g |
| AB | 1B, 2B, 3B | Ammonium nonylphenoxy polyethoxy sulfate, 60% active (POLYSTEP ™ B-1) | 4.8 g | 28.4 g |
| AC | 1C, 2C, 3C | Sodium dodecylbenzene sulfonate, 23% active | 12.6 g | 74 g |
| AD | 1D, 2D, 3D | Polyethylene glycol lauryl ether sodium sulfate, 28% active (STEOL ™ 4N) | 10.4 g | 61 g |
| AE | 1E, 2E, 3E | Mono(nonyl)phenoxy poly(ethyleneoxy)ethyl phosphate ammonium salt, 50% active (WAYFOS ™ M-60) | 5.8 g | 34 g |
| AF | 1F, 2F, 3F | Octylphenoxypolyethoxy-ethanol, 70% active (TRITON ™ X-405) | 4.2 g | 24.4 g |
| AG | 1G, 2G, 3G | Disodium ethoxylated nonylphenol, half ester of sulfosuccinic acid, 33% active (AEROSOL ™ A-103) | 8.8 g | 51.6 g |

Preparation of HEC polymer.

To a three liter flask is charged 340 g DI water which is heated to 85° C. Then 11.0 g 45% solids 100 nm acrylic emulsion, rinsed with 5 g DI water, 3.6 g ammonium persulfate dissolved in 10 g DI water and 0.5 g (29%) aqueous ammonium hydroxide dissolved in 10 g DI water are added. A monomer emulsion consisting of 310 g deionized water, 2.4 g (23% active) sodium dodecylbenzenesulfonate, 416 g BA, 523.8 g MMA, and 12.3 g MAA is prepared. A 94% by weight portion of the monomer emulsion is then fed to the flask over a period of two hours. The reaction to prepare the emulsion polymer is carried out at 85° C. The flask contents are then cooled gradually to 60° C. over a period of one hour. At 65° C., 15 g of a 0.1% iron sulfate heptahydrate solution is mixed with 1.5 g 1.0% Versene solution and added to the flask. This is followed by feeding of three separate mixtures beginning at the same time. The first mixture is 1.9% by weight, based on the weight of the emulsion polymer, of hydroxyethyl cellulose ("HEC") (as a 7.4% solution of CELLOSIZE® Hydroxyethyl Cellulose QP3L (Union Carbide)) mixed with 6.0% of the monomer emulsion (described above) which is fed over 17 minutes. The second mixture is a solution of 1.4 g ammonium persulfate dissolved in 25 g DI water. The third mixture is a solution of 0.3 g sodium sulfoxylate formaldehyde dissolved in 25 g DI water which is fed over 20 minutes. The reaction mixture is held at 60° C. for 20 minutes then 9.7 g (29%) aqueous ammonium hydroxide dissolved in 10 g DI water is added. A solution of 0.35 g (70%) t-butyl hydroperoxide dissolved in 5 g DI water and a solution of 0.17 g isoascorbic acid dissolved in 7.5 g DI water are added. The polymer is expected to have a particle size of 550 nm, and a total solids content of 49.3% by weight.

EXAMPLE 10

Preparation and Evaluation of HEC Polymer/emulsion Polymer Blends

For each of the emulsion polymers identified in Table A, a blend of 15 parts by wt. emulsion polymer is combined with 100 parts by wt. HEC polymer (the HEC polymer prepared hereinabove) for the preparation of the aqueous coating composition below:

Preparation of aqueous coating composition. A white paint is prepared by 15 forming a dispersion containing 72 g propylene glycol, 13.6 g TAMOL 731 (25.0%)pigment dispersant, 1.48 g FOAMASTER VL(defoamer), and 267.64 g titanium dioxide (Ti-Pure R-900) using a COWLES disperser, followed by adding the emulsion polymer blend, TEXANOL coalescent, and NATROSOL 250 MR thickener solution and water to provide an aqueous coating with pigment volume concentration ("PVC")=23.65 and VS(volume solids)=34. The aqueous coating compositions were applied to a coating of Duron Superior House & Trim Exterior Alkyd House Paint—Forest Green Color—Maunfactured by Duron, Inc., Beltsville, Md. which had been painted onto a substrate and allowed to air dry and cure at room temperature for a period of 4 months.

| Paint Made Using | | Paint Made Using |
|---|---|---|
| Example 1A | is expected to have adhesion to alkyd superior to | Comparative Example AA |
| Example 1B | is expected to have adhesion to alkyd superior to | Comparative Example AB |
| Example 1C | is expected to have adhesion to alkyd superior to | Comparative Example AC |
| Example 1D | is expected to have adhesion to alkyd superior to | Comparative Example AD |
| Example 1E | is expected to have adhesion to alkyd superior to | Comparative Example AE |
| Example 1F | is expected to have adhesion to alkyd superior to | Comparative Example AF |
| Example 1G | is expected to have adhesion to alkyd superior to | Comparative Example AG |
| Example 3A | is expected to have adhesion to alkyd superior to | Example 2A |
| Example 3B | is expected to have adhesion to alkyd superior to | Example 2B |
| Example 3C | is expected to have adhesion to alkyd superior to | Example 2C |
| Example 3D | is expected to have adhesion to alkyd superior to | Example 2D |
| Example 3E | is expected to have adhesion to alkyd superior to | Example 2E |
| Example 3F | is expected to have adhesion to alkyd superior to | Example 2F |
| Example 3G | is expected to have adhesion to alkyd superior to | Example 2G |

Aqueous coating compositions including Examples 1A–1G of this invention blended with an HEC polymer are expected to exhibit adhesion to aged alkyd superior to corresponding coating compositions containing Comparative Examples AA–AG.

What is claimed is:

1. A method for providing a coated substrate comprising: forming an aqueous coating composition comprising an aqueous emulsion polymer, the polymer having a glass transition temperature (Tg) from −60° C. to 80° C., formed by the free radical polymerization of at least one ethylenically unsaturated nonionic acrylic monomer, 0.1–50%, by weight based on the total weight of said polymer, ethylenically unsaturated aldehyde reactive group-containing monomer, and 0–7.5%, by weight based on the total weight of said polymer, ethylenically unsaturated acid monomer in the presence of 0.01–1.0%, by weight based on the total weight of said polymer, t-alkyl hydroperoxide, t-alkyl peroxide, or t-alkyl perester wherein the t-alkyl group includes at least 5 Carbon atoms and, optionally, at least one other oxidant;

applying said aqueous coating composition to said substrate; and drying, or allowing to dry, said aqueous composition.

2. A method for providing a scrub resistant coating comprising forming an aqueous coating composition comprising an aqueous emulsion polymer, said polymer having a glass transition temperature (Tg) from −60° C. to 80° C., formed by the free radical polymerization of at least one ethylenically unsaturated nonionic acrylic monomer, 0.1–50%, by weight based on the total weight of said polymer, ethylenically unsaturated aldehyde reactive group-containing monomer, and 0–7.5%, by weight based on the total weight of said polymer, ethylenically unsaturated acid monomer in the presence of 0.01–1.0%, by weight based on the total weight of said polymer, t-alkyl hydroperoxide, t-alkyl peroxide, or t-alkyl perester wherein the t-alkyl group includes at least 5 Carbon atoms and, optionally, at least one other oxidant;

applying said aqueous coating composition to a substrate; and drying, or allowing to dry, said aqueous composition.

3. A method for lowering the minimum film formation temperature of an aqueous coating composition comprising forming an aqueous coating composition comprising an aqueous emulsion polymer, said polymer having a glass transition temperature (Tg) from −60° C. to 80° C., formed by the free radical polymerization of at least one ethylenically unsaturated nonionic acrylic monomer, 0.1–50%, by weight based on the total weight of said polymer, ethylenically unsaturated aldehyde reactive group-containing monomer, and 0–7.5%, by weight based on the total weight of said polymer, ethylenically unsaturated acid monomer in the presence of 0.01–1.0%, by weight based on the total weight of said polymer, t-alkyl hydroperoxide, t-alkyl peroxide, or t-alkyl perester wherein the t-alkyl group includes at least 5 Carbon atoms and, optionally, at least one other oxidant;

applying said aqueous coating composition to a substrate; and drying, or allowing to dry, said aqueous composition.

4. A method for providing adhesion of a coating to a substrate comprising forming an aqueous coating composition comprising an aqueous emulsion polymer, said polymer having a glass transition temperature (Tg) from −60° C. to 80° C., formed by the free radical polymerization of at least one ethylenically unsaturated nonionic acrylic monomer, 0.1–50%, by weight based on the total weight of said polymer, ethylenically unsaturated aldehyde reactive group-containing monomer, and 0–7.5%, by weight based on the total weight of said polymer, ethylenically unsaturated acid monomer in the presence of 0.01–1.0%, by weight based on the total weight of said polymer, t-alkyl hydroperoxide, t-alkyl peroxide, or t-alkyl perester wherein the t-alkyl group includes at least 5 Carbon atoms and, optionally, at least one other oxidant;

applying said aqueous coating composition to said substrate; and drying, or allowing to dry, said aqueous composition.

5. A method for providing adhesion of a coating to an alkyd substrate comprising forming an aqueous coating composition comprising (1) a first aqueous emulsion polymer comprising 0–2%, by weight based on the total weight of said first polymer, ethylenically unsaturated aldehyde reactive group-containing monomer, said first polymer having a glass transition temperature from −60° C. to 80° C. and a particle diameter of 200 to 1000 nanometers, prepared in the presence of 0.001–6%, by weight based on the dry weight of said first emulsion polymer, of a colloidal stabilizer selected from the group consisting of hydroxyethyl cellulose, N-vinyl pyrrolidone, polyvinyl alcohol, partially acetylated polyvinyl alcohol, carboxymethyl cellulose, gum arabic, and mixtures thereof, and (2) a second aqueous emulsion polymer, said second polymer having a glass transition temperature (Tg) from −60° C. to 80° C. and a particle diameter of 30 to 200 nanometers, formed by the free radical polymerization of at least one ethylenically unsaturated nonionic acrylic monomer, 0.1–12.5%, by weight based on the total weight of said second polymer, ethylenically unsaturated aldehyde reactive group-containing monomer, and 0–7.5%, by weight based on the total weight of said second polymer, ethylenically unsaturated acid monomer in the presence of 0.01–1.0%, by weight based on the total weight of said second polymer, t-alkyl hydroperoxide, t-alkyl peroxide, or t-alkyl perester wherein the t-alkyl group includes at least 5 Carbon atoms and, optionally, at least one other oxidant, wherein the dry weight ratio of said second polymer to said first polymer is from 1:99 to 1:1;

applying said aqueous coating composition to said alkyd substrate; and drying, or allowing to dry, said aqueous composition.

* * * * *